United States Patent [19]

Hanse

[11] Patent Number: 4,566,794
[45] Date of Patent: Jan. 28, 1986

[54] APPARATUS FOR INTERFERENCE FRINGE SHIFT SENSING

[75] Inventor: Joel G. Hanse, Edina, Minn.

[73] Assignee: Honeywell Inc., Minneapolis, Minn.

[21] Appl. No.: 256,631

[22] Filed: Apr. 22, 1981

[51] Int. Cl.[4] .............................................. G01C 19/64
[52] U.S. Cl. .................................................. 356/350
[58] Field of Search ........................ 356/350, 345, 346

[56]  References Cited

U.S. PATENT DOCUMENTS

| 4,219,276 | 8/1980 | Dorsman | 356/350 |
| 4,280,766 | 7/1981 | Goss et al. | 356/350 |
| 4,329,056 | 5/1982 | Lacombat et al. | 356/350 |
| 4,342,517 | 8/1982 | Johnson et al. | 356/350 |

Primary Examiner—Vincent P. McGraw
Attorney, Agent, or Firm—Robert A. Pajak

[57] ABSTRACT

An apparatus for determining fringe pattern movement particularly in the art of interferrometric devices. The apparatus of the present invention obtains precise movement of pattern movement without the use of any bias elements for maintaining sensitivity above zero.

1 Claim, 8 Drawing Figures

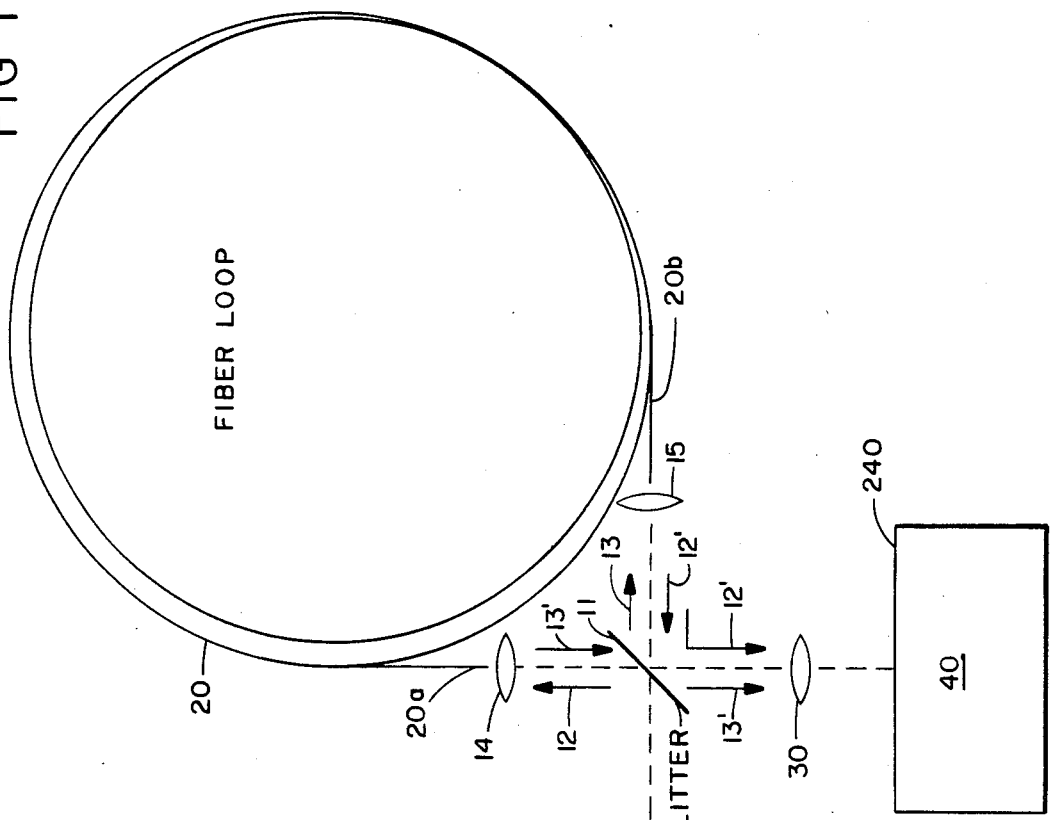
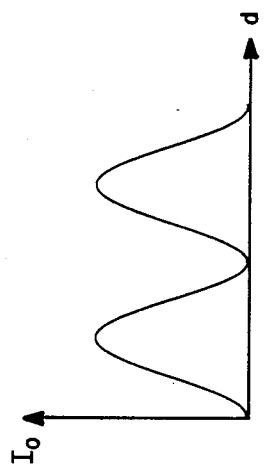

APPARATUS FOR INTERFERENCE FRINGE SHIFT SENSING

The government has rights in this invention pursuant to contract number N00173-80-D-0344, awarded by the Department of the Navy.

The present invention relates to apparatuses for the rapid and accurate determination of the magnitude and direction of a fringe shift of an optical interference pattern, and more particularly relates to a high resolution phase difference detector system for Sagnac ring interferometers in conjunction with an angular rate sensor.

Laser technology in combination with tremendous advances in single-mode optical fibers has made possible the use of a Sagnac ring interferometer employed as an angular rate sensor. The classic Sagnac interferometer employs the use to two counterpropagating waves which counterpropagate through an open-ended ring. When the ring is rotated, a phase shift between the two counterpropagating waves is exhibited. In the classic treatment of the Sagnac effect in the ring interferometer rate sensor, the phase shift exhibited between the two counterpropagating waves resulting from rotation thereof is proportional to the rotation rate of the ring and is of the form:

$$\Delta\phi = \frac{8\pi NA}{\lambda c} \Omega = K\Omega \qquad (1)$$

where:
N is the number of turns in the ring;
A is the area enclosed by a single ring;
$\lambda$ is the free space wave length of the propagating wave;
c is the velocity of light in free space; and
$\Omega$ is the input rotation rate, normal to the loop plane.

Equation (1) says that the phase difference is proportional to the rotation rate. In order to measure the phase difference between the propagating waves and the resultant change in phase difference due to rotation of the ring interferometer, one of the counterpropagating waves must be combined with a reference wave which is unaffected by rotation, or may be combined with the other of the counterpropagating waves, both techniques of measurement are basic and well known measurement techniques for interferometers. The intensity of a pair of combined waves when properly optically combined form an interference fringe pattern which is utilized for deriving information of the resultant change in the phase difference between the counterpropagating waves due to rotation. The intensity of the combined waves is proportional to $\cos^2 \Delta\phi$, as is well known, $\Delta\phi$ being the phase difference between the combined waves.

In a typical ring interferometer utilizing a single photodetector, the sensitivity of the detector to small changes in rotation becomes zero as the rotation rate, $\Omega$, becomes zero. This is so since the counterpropagating waves travel about identical optical paths and the waves add in phase to a maximum intensity value when the interferometer is at rest. Thus, at a maximum or minimum intensity value at the single detector, the rate of change of intensity value for small variations in phase difference between the interferring waves about either the maximum or minimum intensity value is zero or very low resulting in poor sensitivity to rotation. In the prior art, the problem of low sensitivity in ring interferometer rate sensors is avoided by providing a variable or fixed phase shift bias element in the path of the counterpropagating waves so that the waves operate at maximum sensitivity, the maximum sensitivity occurring at the quadrature point, that point being the phase difference between the propagating waves which causes the intensity value to be between minimum and maximum intensity levels.

Addition of a bias element, as just described, to the ring interferometer, particularly when used as a rate sensor, adds a large bothersome error in addition to other encountered interferometer errors. Other methods of operating a ring interferometer rate sensor to circumvent the "low sensitivity" problem have been tried, but usually are expensive and also add additional errors to the system.

In the present invention, a novel interference fringe pattern detection system is provided allowing continuous, non-zero, sensitivity phase difference measurements to be made without the use of a bias in the Sagnac ring interferometer.

SUMMARY OF THE INVENTION

In the present invention, an interference fringe pattern detection system employs signals derived from an interference fringe pattern which are in phase quadrature, combines these phase quadrature signals and provides a signal directly related to a positional change in the interference fringe pattern resulting from changes in the phase difference between the interferring waves in which sensitivity thereof is continuous and non zero.

BRIEF DESCRIPTION OF THE DRAWINGS

FIG. 1 is a schematic drawing of a ring interferometer rate sensor utilizing a fiber optic coil.

FIG. 1a is a graphical representation of intensity versus distance of an interference fringe pattern.

DETAILED DESCRIPTION OF THE INVENTION

Figure 2:
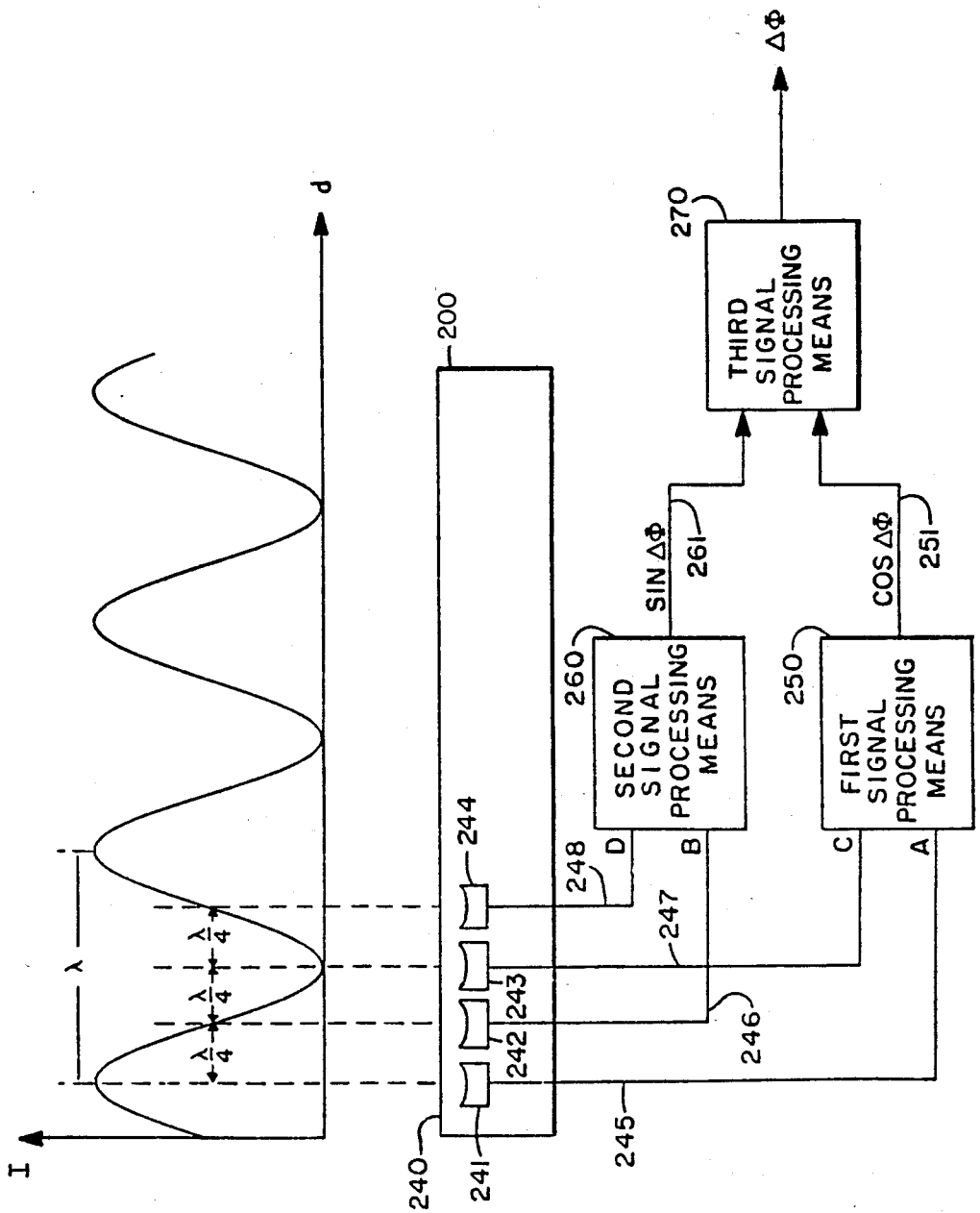
FIG. 2 is a schematic drawing of one embodiment of the interference fringe pattern detection system of the present invention.

A ring interferometer utilized as a rate sensor is shown in FIG. 1. Laser 10 provides a propagating wave toward beam splitter 11 which is turn provides a reflective propagating wave indicated by arrow 12 and a transmitted propagating wave indicated by arrow 13. Reflective wave 12 enters fiber optic loop 20 at open end 20a thereof through focusing lens 14. Reflective wave 12 propagates through the wave guide provided by fiber optic loop 20 and exits at open end 20b and propagates toward beam splitter 11 through focusing lens 15 as indicated by wave 12'. Wave 12' is reflected by beam splitter 11 toward interference fringe pattern sensing apparatus 40 through focusing lens 30. The transmitted wave 13 enters fiber optic loop 20 at open end 20b thereof through focusing lens 15. Transmitted wave 13 propagates through the fiber optic loop wave guide 20 and exits at open end 20a and propagates toward beam splitter 11 through focusing lens 14 as indicated by wave 13'. Wave 13' is transmitted through beam splitter 11 toward interference fringe pattern sensing apparatus 40 through focusing lens 30.

At the surface 240 of sensing apparatus 40 is an interference pattern resulting from the interference of waves 12' and 13'. This interference pattern may be a circular fringe pattern or a linear fringe pattern. The style of pattern is determined by the angular relationship between waves 12' and 13' as they propagate from beam splitter 11 toward sensing apparatus 40. The angular relationship of 12' and 13' is determined by the optical element configuration, as determined by the placement of beam splitter 11, fiber ends 20a and 20b, and by lenses 14 and 15 which align and focus waves 12 and 13 and corresponding waves 12' and 13'. In the discussion that follows, a linear fringe pattern across the surface 240 will be assumed, although the present invention is not limited to such a pattern. The intensity of the interference pattern versus distance across the surface 240 is graphically represented in FIG. 1A as is well known in the art.

The system as just described represents a Sagnac ring interferometer. At the surface of sensing apparatus 40 is a linear interference pattern consisting of light and dark bands resulting from the interference of waves 12' and 13'.

The interference fringe shift sensing apparatus 40 includes a photodetector responsive to the light intensity, $I_o$, of the combined waves 12' and 13' having an output signal as indicated graphically in FIG. 1a and can be mathematically expressed by:

$$V = I_o(1 - \cos \Delta\phi) \quad (2)$$

where:
V is an output signal quantity directly related to the maximum intensity at the photodetector, $I_o$;
$\Delta\phi$ is the instantaneous phase difference between waves 12' and 13'.

The instantaneous phase difference, $\Delta\phi$, can be expressed in terms of fringe spacing, $\lambda$, and the positional change in the fringe, $\Delta d$, measured from an intensity maximum, as:

$$\Delta\phi = \frac{2\pi \Delta d}{\lambda}$$

Sensing apparatus 40 may also include a second photodetector positioned less than one fringe spacing away from the first detector in order to ascertain direction of rotation since a single photodetector cannot provide such information because the interference pattern created, as indicated in FIG. 1a, is symmetrical about any maximum or minimum intensity level.

As indicated by equation (2), the output of the photodetector for the fiber optic rate sensor of FIG. 1 is a trigonometric function of the instantaneous phase difference between the propagating waves 12 and 13 traveling in the fiber optic loop wave guide and the corresponding output waves 12' and 13'. Differentiation of the photodetector output, expressed by equation (2), with respect to $\Delta\phi$ yields:

$$\frac{dV}{d\Delta\phi} = I_o \sin\Delta\phi \quad (3)$$

The differentiation expressed in equation (3) is a measure of the sensor sensitivity to changes in the phase difference between phase shifted waves 12' and 13' due to the Sagnac effect of rotation upon waves 12 and 13 propagating through the rotated fiber optic wave guide 20.

Analysis of equation (3) shows that the sensor sensitivity is zero for phase difference values being integer multiples of $\pi$, and is very low about such values. Substituting equation (1) into equation (3) indicates that there are discrete values of rotation, $\Omega$, where the photodetector output is insensitive to rotation, these occurring at values of $\kappa\Omega$ being integer multiples of $\pi$. On the other hand, the sensor sensitivity is at a maximum for the single sensor photodetector for phase difference values and corresponding rotation rates being odd integer multiplies of $\pi/2$.

In order to circumvent the problems associated with those instances where minimal sensor sensitivity occurs, a nonreciprocal phase shifter biasing element such as a Faraday cell can be added to the system shown in FIG. 1 as earilier indicated. By continuously modulating the phase shifter so that $\Delta\phi$ is substantially $\pi/2$, maximum sensor sensitivity to changes in phase difference corresponding to changes in rotation rates is obtained. However, adding such a phase shifter introduces a bias error causing erroneous rate measurements due to fluctuations in the phase shifter.

Other systems in the prior art for obviating the low sensitivity problem in the fiber optic ring interferometer include among other systems, acousto-optic modulators for modulating the frequencies of the counterpropagating waves. Like the Faraday cell, the acousto-optic modulators also introduces bias errors also causing an erroneous rate measurement due to the added components.

Shown in FIG. 2 is a block diagram of the interference fringe pattern detection system of the present invention used for the sensing apparatus 40 indicated in FIG. 1. The novel interference fringe pattern sensing apparatus shown in FIG. 2 measures shift or positional change in the interference fringe pattern such as that created on the surface 240 of sensing apparatus 40 in FIG. 1. The novel sensing apparatus of the present invention obviates the need for any additional biasing elements or other means for obtaining useful rate information from the ring interferometer, and does not introduce any modulating noise errors into the system.

In FIG. 2, photodetector system 200 is shown having surface 240 at which four light sensitive photodetectors 241, 242, 243, and 244 are positioned at the surface 240 for providing electrical signals on photodetector output connecting means 245, 246, 247 and 248 respectively. Detector system 200 is positioned in a manner so as to be responsive to the linear interference pattern created on the surfce 240 by the interferring waves 12' and 13' as earlier indicated with reference to FIG. 1. Further, each of the photodetectors are positioned in a predetermined manner as will be described in more detail. Generally, the output signals provided by each of the photodetectors is amplified by adjustable gain amplifiers not shown. It is assumed in the following discussion, that the photo sensitive output signals on output connecting means 245, 246, 247, and 248 will respond to identical light intensities with identical electrical signals, and will have sufficient signal strength.

Shown just above the surface 240 of detector system 200 in FIG. 2 is a graphical representation of resulting light intensity versus distance at the surface 240 of detector 200 which, by way of example, is a typical interference pattern which may be created at surface 240 by the propagating waves 12' and 13'. The separation between intensity maximums, known as the fringe spacing, is defined as λ. The spatial separation of the fringe spacing at the detector surface 240 is, of course, determined by the frequency of the propagating waves 12' and 13' and the angular misalignment of the two propagating waves exiting from beam splitter 11 and the position of detector system 200 as is well known in the art. Knowing the value of λ, detectors 241, 242, 243, and 244 are positioned such that detectors 241 and 243 are spatially separated by λ/2 whereby the signals received and produced by detectors 241 and 243 are in counterphase, separated by 180°. Similarly, detectors 242 and 244 are spatially separated by λ/2. The position of detectors 242 and 244 are spatially displaced from detectors 241 and 243 by λ/4 respectively. Output signals produced by detectors 241 and 243 in accordance wih the detector spacing as aforesaid, will be in phase quadrature with the signals produced by detectors 242 and 244, respectively.

The output of photodetectors 241 and 243 having output signals defined as A and C respectively are presented to first signal processing means 250 through connecting means 245 and 247 respectively. Signal processing means 250 provides a normalized output signal being a trigonometric function of the phase difference between the counterpropagating waves derived from the interference pattern created on the surface 240 of detector system 200. The output of photodetectors 242 and 244 having output signals B and D respectively are presented to second signal processing means 260 through connecting means 246 and 248 respectively. Second signal processing means 260 is similar to first signal processing means 250 and provides a normalized trigonometric function of the phase difference between the counterpropagating waves also derived from the interference pattern created on the surface 240 of detector system 200 but at a different spatial location. As will be explained in more detail, the output signals of first and second signal processing means 250 and 260, are in phase quadrature and are presented to third signal processing means 270 through connecting means 251 and 261 respectively.

Third signal processing means 270 combines the trigonometric functions of the phase difference between the counter propagating waves provided by first and second signal processing means 250 and 260 and provides an output signal proportional to the total phase difference between the counterpropagating waves 12' and 13' derived from the interference pattern on the surface of detector 200. Further, and more importantly, third signal processing means combines said phase quadrature signals in a predetermined manner so that the output signal sensitivity to the phase difference reflects the sensitivity of the phase quadrature signals at all instances and is substantially equal to or greater than the sensitivity of either one of the phase quadrature signals at any instance regardless of the value of the phase difference.

The operation of the fiber optic rate sensor shown in FIG. 1 and the interference fringe pattern sensing apparatus shown in 2 and, in particular, the functions provided by first, second and third signal processing means 250, 260, and 270 will now be described.

Output signals A, B, C, and D provided by detectors 241, 242, 243, and 244 respectively when positioned as described above will have the following mathematical relationships:

$$A = I_o[1 - \cos\Delta\phi] = I_o\left[1 - \cos\left(\frac{2\pi\Delta d}{\lambda}\right)\right] \quad (4)$$

$$B = I_o[1 + \sin\Delta\phi] = I_o\left[1 + \sin\left(\frac{2\pi\Delta d}{\lambda}\right)\right] \quad (5)$$

$$C = I_o[1 + \cos\Delta\phi] = I_o\left[1 + \cos\left(\frac{2\pi\Delta d}{\lambda}\right)\right] \quad (6)$$

$$D = I_o[1 - \sin\Delta\phi] = I_o\left[1 - \sin\left(\frac{2\pi\Delta d}{\lambda}\right)\right] \quad (7)$$

As indicated by the above expressions for the output of each of the photodetectors in detector system 200 as shown in FIG. 2, each photodetector output signal contains the term $I_o$ representing the maximum intensity of the interference pattern created at the surface 240 of detector system 200. If intensity alone is used as a parameter for determining the phase difference between the propagating waves 12' and 13', variations in the individual intensities of propagating waves 12' and 13' will adversely impact the value of the subsequently determined phase difference. In order to obviate the impact of intensity variations in waves 12' and 13', a normalization process can be used in order to eliminate the intensity magnitude, $I_o$, in the expressions for the photodetector output signals in equations (4) through (7). The first and second signal processing means 250 and 260 provide such normalization.

The output of the first signal processing means 250 is the difference between signals A and C divided by the sum of signals A and C which provides a signal directly related to the cosine function of the change in the fringe position, Δd, divided by λ, multiplied by 2π which corresponds directly to the phase difference between the propagating waves 12' and 13' derived from the interference pattern as indicated mathematically below.

$$\frac{C - A}{C + A} = \cos\Delta\phi = \cos\left(\frac{2\pi\Delta d}{\lambda}\right) \quad (8)$$

Similarly, second signal processing means 260 provides normalization of signals B and D which are in phase quadrature with signals A and C respectively providing an output signal directly related to the sine function of the change in fringe position Δd, divided by λ, multiplied by 2π which corresponds directly to the phase difference between the propagating waves 12' and 13' as indicated mathematically below:

$$\frac{B - D}{B + D} = \sin\Delta\phi = \sin\left(\frac{2\pi\Delta d}{\lambda}\right) \quad (9)$$

The above operation eliminates the value of $I_o$. Having normalized the phase quadrature signals provided by detectors 241, 242, 243 and 244, the output of first and second signal processing means 250 and 260 having output signals cosine ($\Delta\phi$) and sine ($\Delta\phi$) respectively, can be combined by a third signal processing means 270 to provide a signal proportional to $\Delta\phi$ or $\Delta d$. Third signal processing means 270 in the embodiment of the invention shown in FIG. 2 first computes the value of the second signal processing means output signal, sin ($\Delta\phi$), divided by the value of the first signal processing means output signal, cos ($\Delta\phi$), which, by trigonometric identities, is the tangent function of the phase difference between the propagating waves 12' and 13'. Taking the arctangent of the above division results in the actual phase difference between the propagating waves 12' and 13'. The computation provided by the third signal processing means 270, and using the equalities set forth in equation (1), is mathematically expressed by:

$$\tan^{-1}\left(\frac{\sin\Delta\phi}{\cos\Delta\phi}\right) = \Delta\phi = \frac{2\pi\Delta d}{\lambda} = K\Omega \quad (10)$$

Careful analysis of equation (10) shows that the first derivative of the arctan with respect to $\Delta\phi$ is a measure of the output signal sensitivity and is never zero. Further, the minimal output signal sensitivity to $\Delta\phi$ is never less than the maximum sensitivity of a system utilizing a single normalized signal as a measure of phase difference. Thus, the embodiment shown in FIG. 2 provides an interference fringe pattern sensing apparatus having an output signal proportional to fringe positional change $\Delta d$ corresponding to a change in the phase difference $\Delta\phi$ between interferring wave 12' and 13'. The output signal sensitivity to changes in phase difference being always greater than zero.

The sensing apparatus of the present invention can be applied to any interference fringe pattern and is particularly useful in fiber optic rate sensors where accuracy is paramount. Note that equation (10) can be rewritten using $\Delta d$, the fringe positional change:

$$\tan^{-1}\left\{\frac{\cos\left(\frac{2\pi\Delta d}{\lambda}\right)}{\sin\left(\frac{2\pi\Delta d}{\lambda}\right)}\right\} = \frac{2\pi\Delta d}{\lambda} \quad (11)$$

and thus, the output signal of third signal processing means 270 is a signal directly related to fringe positional change from some reference.

Note that the arctangent function provided by third signal processing means 270 and indicated by equations (10) and (11) is limited to values between $-\pi/2$ and $+\pi/2$, and thus the output is limited to an interference pattern positional change of $\lambda/2$ or a phase difference of $\pi$ radians. In order to broaden the utilization of the principles of the invention embodied in FIG. 2, a means must be added to third signal processing means 270 for detecting and keeping track of $\pm\pi/2$ radian limits of the arctangent function for expanding the limits of the sensing apparatus greater than $\pi$ radians or greater than $\lambda/2$ fringe shift.

Figure 3:
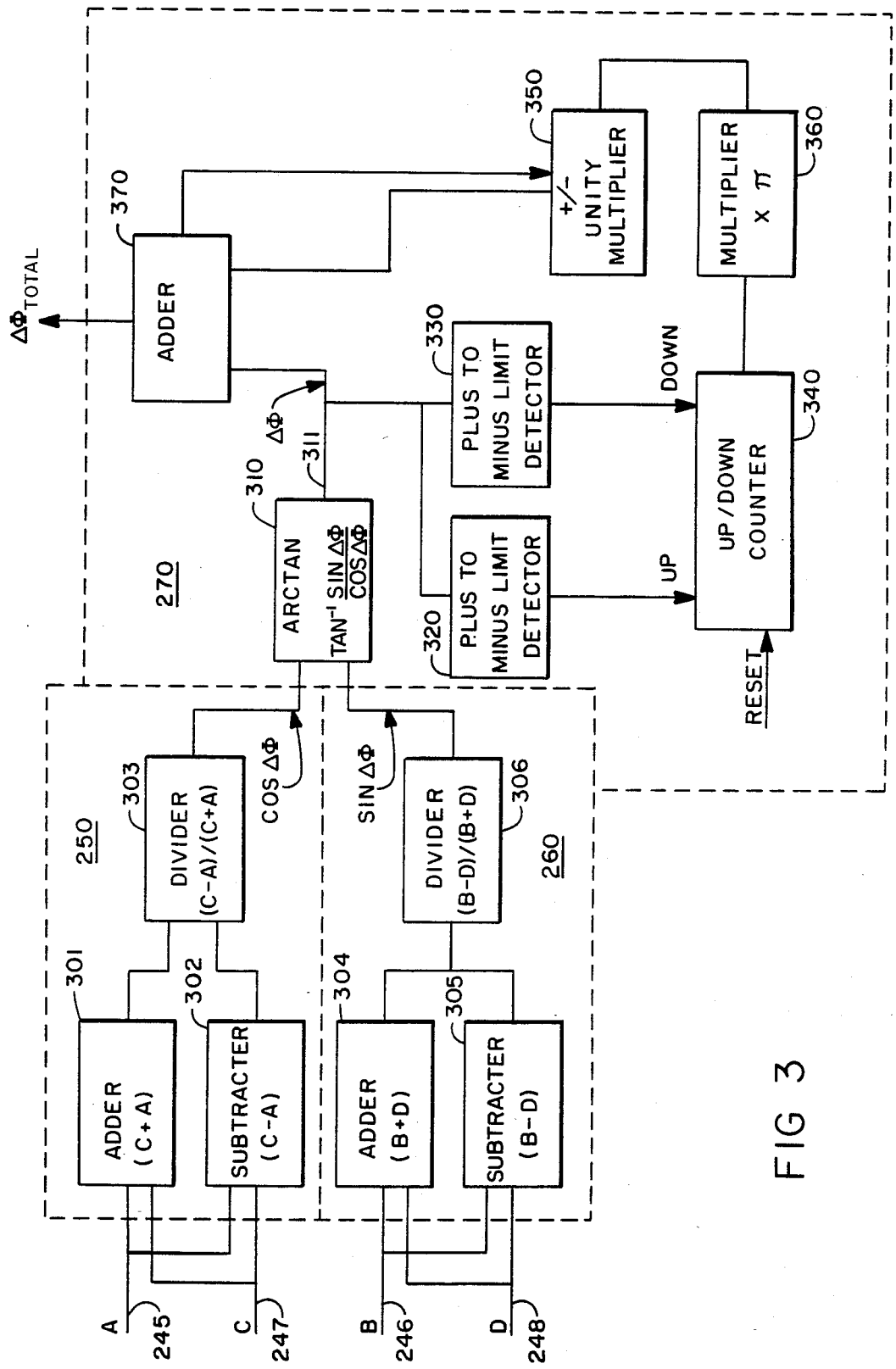
FIG. 3 is a detailed block diagram of the detection system of FIG. 2.

Shown in FIG. 3 is a more detailed diagram of the embodiment of the invention shown in FIG. 2 including examples of implementation of first and second signal processing means 250 and 260 for signal normalization, and also includes a further amplified description of third signal processing means 270 which is capable of detecting phase difference values between counterpropagating waves 12' and 13' greater than $\pi$ radians and, of course, greater than $\lambda/2$ in the interference pattern.

Referring now to FIG. 3, the first signal processing means 250 and second signal processing means 260 are shown in FIG. 3 in dotted line blocks. First signal processing means 250, by way of example, is shown as a combination of analog circuits including ADDER 301, SUBSTRACTER 302, and DIVIDER 303 which perform the computations as indicated earlier with respect to equation (8). Similarly, second signal processing means 260 as shown in FIG. 3 includes ADDER 304, SUBSTRACTER 305, and DIVIDER 306 performing the computation as expressed in equation (9). The output of DIVIDER 303 and 306 are presented to the Arctan Block 310 which computes first the division of sine $\Delta\phi$ from the output of DIVIDER 306 divided by cosine $\Delta\phi$ from the output of DIVIDER 303. Arctan Block 310 further performs the arctan function of the above division as indicated by equation (10). The Arctan Block 310 may be any of a variety of analog circuits for computing the ratio and the arctan function. The output of the arctan function is a signal representative of the angle $\Delta\phi$ between plus and minus $\pi/2$ radians, and is provided at the output means 311 of Arctan Block 310.

The output signal of Arctan Block 310 on output signal means 311 is presented to a plus to minus limit detector 320, and also to a minus to plus limit detector 330. The output of detector 320 is connected to the UP input of an UP/DOWN counter, and The output of minus to plus limit detector 330 is presented to the DOWN input of the UP/DOWN counter 340.

The output of UP/DOWN counter 340 is presented to a multiplier 360 which multiplies the "number output of UP/DOWN counter 340 by $\pi$. The output of multiplier 360 is multiplied by the $+/-$ unity multiplier 350 and presented to ADDER 370 which adds the output of multiplier 350 to the output of the Arctan Block 310 presented to ADDER 370 through output means 311. The "sign" of Adder 370 directs operation of $+/-$ unity multiplier 350. When the Adder is positive, multiplier 350 multiplies the output of multiplier 360 by a positive one, and when the Adder is negative, by a negative one.

Limit detectors 320 and 330, $+/-$ unity multiplier 350, counter 340, and mulitplier 360 can be constructed utilizing a variety of well known electronic circuit blocks including, among others, analog multipliers, digital counters, inverters, and operational amplifiers as is well known to those skilled in the art. As will now be described, the output of ADDER 370 is the total phase change in the phase difference, $\Delta\phi$, between the propagating waves 12' and 13' derived from total positional change, $\Delta d$, in the fringe interference pattern created on the surface 240 of detector system 200. In order to explain the operation of FIG. 3 reference is made to FIG. 4 which is a graphical representation of the output of ADDER 370, the total phase change in the phase difference between the propagating waves 12' and 13', versus the change in fringe pattern position $\Delta d$. The embodiments shown in FIG. 3 will be described with reference to FIGS. 1 and 4 for the ring interferometer utilized as an angular rate sensor.

Figure 4:
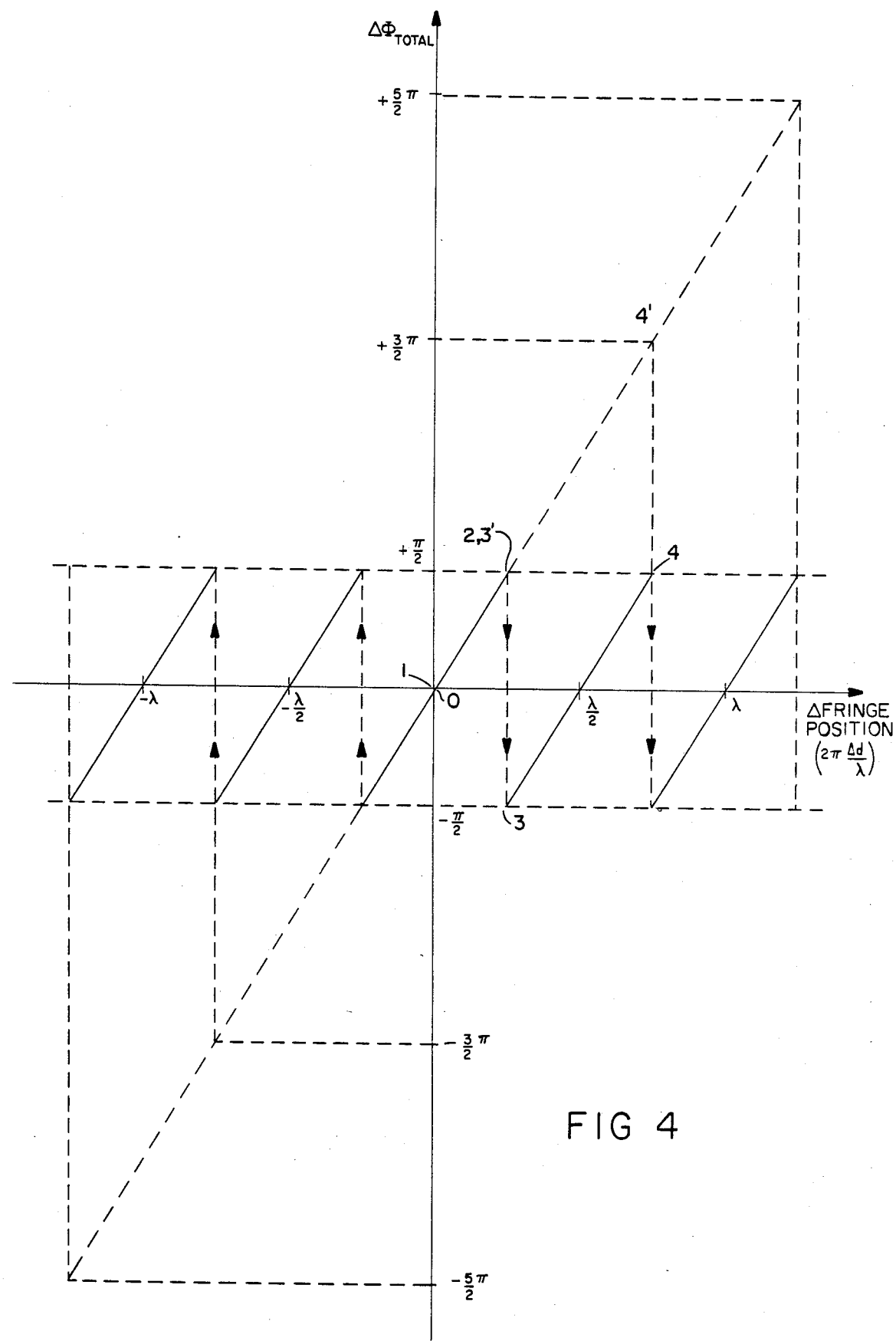
FIG. 4 is a graphical representation of the output of the detection system shown in FIG. 3.

Assume the situation of zero rotation of the ring interferometer in FIG. 1 and that the phase difference between the propagating waves 12' and 13' is zero. Further assume that the arctan function in these circumstances is also zero and that the UP/DOWN counter 340 has been reset to zero. Therefore, the addition produced by ADDER 370, which provides the total phase change in the phase difference between the propagating waves is also zero. This is indicated in FIG. 4 at point 1. Arbitrarily defining an increase in the phase difference between the propagating waves corresponds to a fringe pattern change to the right, a shift in the fringe pattern to the right of a finite amount will cause the output signal of Arctan Block 310 to linearly increase toward $\pi/2$ radians as indicated by point 2 in FIG. 4. In these circumstances, the output of the Adder 370 is simply the positive output of the Arctan Block 310 since the counter 340 is zero. Further, the positive output of Adder 370 sets the unity multiplier to positive.

Any further increase in the phase difference in the propagating waves 12' and 13' will cause the arctan value to suddenly change from plus $\pi/2$ radians to minus $\pi/2$ radians. This just described transient change in the Arctan Block 310 is detected by plus to minus limit detector 320 which causes the UP/DOWN counter to increment by one. The UP/DOWN counter output number is multiplied by $\pi$ radians by multiplier 360 and multiplied by plus unity by multiplier 350. The ADDER will then add the value minus $\pi/2$ radians from the output of Arctan Block 310 to the output of multiplier 350 being plus radians with the resultant of ADDER 370 being plus $\pi/2$ radians as indicated by point 3. Any further increase in the phase difference between the propagating waves 12' and 13' will cause a corresponding change in the Arctan Block 310 as shown in FIG. 4 between points 3 and 4 corresponding to a change from minus $\pi/2$ radians to plus $\pi/2$ radians. This change in the output of Arctan Block 310 is added directly by ADDER 370 to the output of multiplier 350 being plus $\pi$ radians. The output of ADDER 370 for fringe positional change between points 3 and 4 as indicated in FIG. 4 results in a change in output signal from ADDER 370 between points 3' and 4'.

Thus, as shown in FIG. 4, a positive fringe shift of $3\lambda/2$ caused by a corresponding change of $3\pi/2$ radians in the phase difference between the propagating waves 12' and 13' results in the output of ADDER 370 changing $3\pi/2$. Since the phase difference between waves 12' and 13' in FIG. 1 is directly related to the rotation rate as indicated by equation (1), the output of ADDER 370 is directly and substantially linearly related to the rotation rate of the ring interferometer substantially shown in FIG. 1 without the use of any bias elements and has a continuously non-zero output signal sensitivity.

Rotation rates decreasing as those already described is determined in a similar manner by utilization of minus to plus limit detector 330 which detects a change in the output of Arctan Block 310 changing from minus $\pi/2$ radians to pluse $\pi/2$ radians and causing a DOWN count of UP/DOWN counter 340. When the count is reduced to zero, a further signal applied to the DOWN count input will cause the count to again increase, but the output of Adder 370 in this situation will cause multiplier 350 to be negative unity. Further increases in rotation of opposite direction will cause the output of Adder 370 to decrease in a similar manner as already described, having "sign" related to rotation direction.

It is possible to construct UP/DOWN counter 340 to have an output including the "sign". In this arrangement, multiplier 350 can be eliminated since the sign would be included in the output of counter 340. Many possible arrangements are, of course, possible, and can be implemented by a variety of commercially available analog and digital circuits. As will be shown, the entire scheme just presented can be implemented using a computational device.

Thus, the interference fringe pattern sensing apparatus combined with the ring interferometer rate sensor shown in FIG. 1 provides an output signal directly related to rotation rate with an output signal sensitivity to rotation rate always greater than zero with sensitivity values greater than that provided by the prior art.

Figure 5:
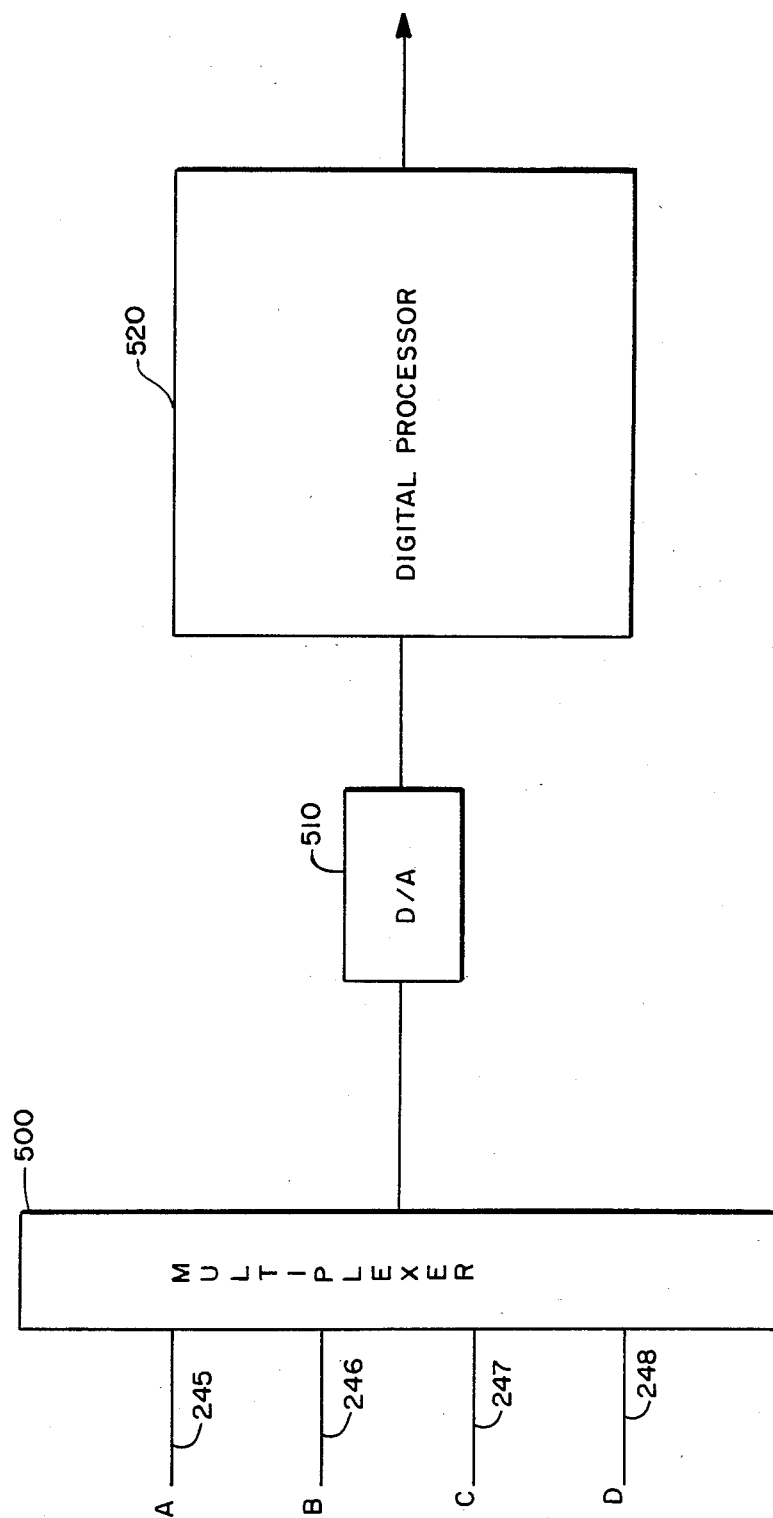
FIG. 5 is a block diagram of a digital implementation of the embodiment of the present invention shown in FIG. 2.

Of course, the embodiments shown in FIG. 3 can be implemented by either analog circuitry, digital circuitry or a combination of the two. Shown in FIG. 5 is a digital implementation of the embodiment shown in FIG. 3. Once again, the signals A, B, C, and D from photodetectors 241, 242, 243, and 244 are provided as inputs to a switching multiplexer 500 which sequentially connects the input signals to a digital to analog converter 510 having an output connected to a digital processor 520. Digital processor 520 can be any computational device such as a general purpose computer, a microprocessor, or the like, which provides the computations as indicated in Equations (1) through (10) in a manner somewhat similar as that described with reference to FIG. 3.

Although the embodiments shown in FIG. 2 employs the use of four photodetectors for obtaining normalized interference pattern intensity signals in phase quadrature, other means are possible for obtaining such normalized phase quadrature signals. Normalization, as indicated earlier, is needed to remove the photodetector sensitivity to variations in the intensity of waves 12' and 13'. Another technique for obtaining normalized phase quadrature signals can be accomplished by the use of three photodetectors and a somewhat different computational processing scheme. Assume that only the outputs of photodetectors 241 and 242 are available, these signals being in phase quadrature with each other. As before, the output of photodetector 241 has an output signal A, having the same expression as shown earlier in equation (4) and the output of photodetector 242 has an output signal, B, having the same expression as shown earlier in equation (5).

Figure 6:
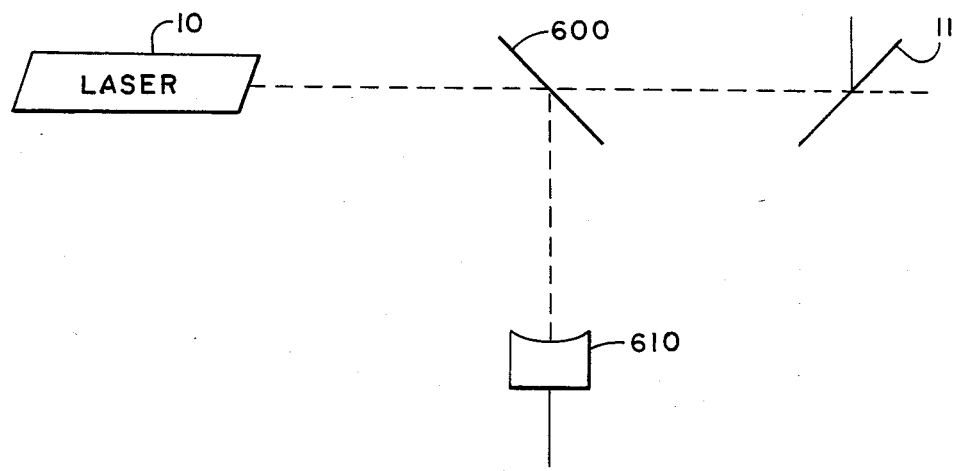
FIG. 6 is another embodiment of the present invention.

Referring now to FIG. 6, assume that a second beam splitter 600 is inserted between laser source 10 and beam splitter 11 of FIG. 1 whereby a reflected output wave is measured by a third photodetector 610 and the transmitted wave through beam splitter 600 is directed as before onto beam splitter 11. The output of detector 610, I', is an output signal proportional to the beam intensity provided by laser 10 and would, of course, be proportional to the intensities of the propagating waves 12, 12', 13 and 13', and also proportional to maximum intensity of the combined waves 12' and 13' creating the interference pattern.

Solving for the cosine of the phase shift in equation (4) and the sine of the phase shift in equation (5) yields:

$$-\sin\Delta\phi = \frac{B - I_o}{I_o} \quad (11)$$

-continued $$-\cos\Delta\phi = \frac{A - I_o}{I_o} \quad (12)$$

Since $I_o$ is some fraction of the laser power $I'$ and measured by detector 610, $I_o$ can be treated as a known value, thus the ratio of equation (11) and (12) can be written as:

$$\frac{\sin\Delta\phi}{\cos\Delta\phi} = \frac{B - K\Gamma}{A - K\Gamma} \text{ and} \quad (13)$$

$$\Delta\phi = \tan^{-1}\left(\frac{B - K\Gamma}{A - K\Gamma}\right). \quad (14)$$

Thus, after calibration and determination of K, three detectors can be used to provide, again, an output proportional to $\Delta\phi$ or $\Delta d$ utilizing appropriate computational electronics in a manner indicated by FIGS. 2, 3 and 5.

In the above discussion of FIGS. (2) through (6), third signal processing means 270 was described, by way of example, as a computational device for combining the outputs of first and second signal processing means for obtaining signals in phase quadrature representative of positional displaced intensity levels of the interference pattern to be analyzed. Specifically, third signal processing means 270 was shown to be a means for providing the arctan function of the ratio of phase quadrature signals. The nature of the arctan function operated on the phase quadrature signals essentially acts as a decision control for deciding which of the phase quadrature signals is nearer to the maximum sensitivity point. This is so, since when the sine function is operating at maximum sensitivity, the cosine function is operating at minimum sensitivity. The arctan combination of these signals substantially provides an analog descision making processor for deciding which of these signals is at maximum sensitivity.

Shown in FIG. (7) is another example of third signal processing means 270 for obtaining an output signal directly related to total phase change between waves 12' and 13', as before, and the sensitivity thereof being non-zero for any phase difference, $\Delta\phi$.

Referring now to FIG. (7) the output of first signal processing means 250 is presented to arccosine block 710 through connecting means 251. The output of arccosine block 710 is first passed through a digital filter 711 and presented to a weighted digital filter 720. The output of second signal processing means 260 is presented to an arcsine block 740 through connecting means 261. The output of arcsine block 740 is passed through digital filter 741 and is also presented to weighted digital filter 720.

Figure 7:
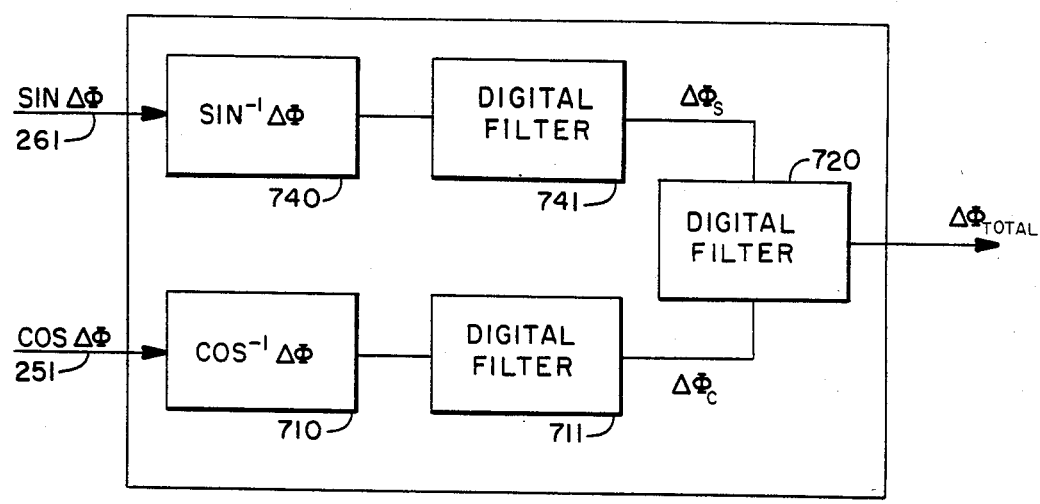
FIG. 7 is a block diagram of an implementation of a signal processor which can alternatively be used in the embodiment of FIG. 2.

In operation, the third signal processing means 270 substantially shown in FIG. 7 will now be described. Digital filters 711 and 741 smooth out the outputs of arccosine block 710 and arcsine block 740. The output of these respective filters is presented to a weighted digital filter 720 which combines the outputs of digital filters 711 and 741 to provide an average value of the phase shift resulting from the arcsine and arccosine measurements provided by blocks 740 and 710. Weighted digital filter 720 essentially provides a switching between the outputs of first and second signal processing means providing the phase quadrature signals. Thus, the output of weighted digital filter 720 provides an output signal directly related to the total change in phase difference between the counterpropagating waves 12' and 13', as already indicated, and is directly related to the total positional change in the interference pattern, and further, is related to the rotational rate of the fiber-optic loop 20 in FIG. 1.

It should be clearly understood that the details of foregoing embodiments are set forth by way of example only. The interference fringe pattern detection system of the present invention can be applied to any of many types of interference patterns. Further, although I have shown a specific example for obtaining normalized phased quadrature signals derived from the interference pattern, other means of normalization are of course possible. Lastly, although the output signals of first and second signal processing means 250 and 260 in FIG. 2 are shown to be in phase quadrature, the invention is not limited thereto, and such signals could be phase separated by $\pi/4$ radians or less. Accordingly, it is contemplated that this invention be not limited by the particular details of the embodiments illustrated herein except as defined by the appended claims.

The interference fringe pattern detection system in combination with a fiber optic rate sensor has obviated the need for bias elements of the prior art and thus has been illustrated herein as a new and useful fiber optic rate sensor. It is to be understood that the present invention can be applied to any systems requiring precise knowledge of the phase difference between interferring waves, another application being magnetometers although has not been illustrated.

I claim:

1. A fiber optic rate sensor comprising:
a source of radiation emitting at least one monochromatic electromagnetic wave;
an optical fiber wound around a defined input axis;
means for directing first and second portions of said wave to travel through said fiber in opposite directions and recombining said first and second portions after travel through said fiber so as to be capable of establishing an interference fringe pattern which varies in relation to rotation of said optical fiber;
detector means having at least first, second, third, and fourth detectors responsive to said interference fringe pattern for generating first, second, third, and fourth detector signals such that said first and second detector signals are substantially in phase quadrature to each other, said third and fourth detector signals are substantially in phase quadrature to each other, and said first and third detector signals are in opposite phase with each other; and
signal processing means having, first function means for providing an output signal indicative of the sum of said first and third detector signals,
second function means for providing an output signal indicative of the difference between said third and first detector signals,
third function means for providing an output signal indicative of the sum of said second and fourth detector signals,
fourth function means for providing an output signal indicative of the difference between said second and fourth detector signals,
fifth function means for providing an output signal indicative of the ratio of said output signals of said first and second funcion means, and sixth function means for providing an output signal indicative of the ratio of said output signals of said third and fourth function means; and means for obtaining the arc tan value of the ratio of said fifth and sixth function means output signals thereby producing an output signal representative of the magnitude of movement of said interference fringe pattern movement.

* * * * *